US008827526B2

(12) United States Patent
Chen et al.

(10) Patent No.: US 8,827,526 B2
(45) Date of Patent: Sep. 9, 2014

(54) BACKLIGHT MODULE AND OPTICAL PLATE THEREOF

(75) Inventors: Shih-Chieh Chen, Hsin-Chu (TW); Chih-Chuan Chang, Hsin-Chu (TW); Yao-Chi Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 111 days.

(21) Appl. No.: 13/478,132

(22) Filed: May 23, 2012

(65) Prior Publication Data

US 2013/0128615 A1 May 23, 2013

(30) Foreign Application Priority Data

Nov. 18, 2011 (TW) .............................. 100142445 A

(51) Int. Cl.
*F21V 8/00* (2006.01)
*F21V 17/00* (2006.01)
*F21S 8/00* (2006.01)
*F21V 7/10* (2006.01)

(52) U.S. Cl.
CPC ................ *F21S 8/00* (2013.01); *G02B 6/0043* (2013.01); *G02B 6/0061* (2013.01); *F21V 17/00* (2013.01); *G02B 6/0088* (2013.01); *G02B 6/0055* (2013.01); *F21V 7/10* (2013.01)
USPC ............................ 362/609; 362/624; 362/629

(58) Field of Classification Search
CPC ........................................................ F21S 8/00
USPC .................. 362/609, 611, 620–629
See application file for complete search history.

(56) References Cited

U.S. PATENT DOCUMENTS

| 7,014,349 | B2 | 3/2006 | Shinohara |
| 7,670,041 | B2 | 3/2010 | Tsai |
| 7,674,029 | B2 | 3/2010 | Liu |
| 8,342,729 | B2 | 1/2013 | Chang |
| 2004/0240194 | A1 | 12/2004 | Lao |
| 2012/0147627 | A1* | 6/2012 | Pan ............................... 362/624 |
| 2012/0320628 | A1 | 12/2012 | Chang |

FOREIGN PATENT DOCUMENTS

| CN | 101149525 A | 3/2008 |
| CN | 201060283 Y | 5/2008 |
| CN | 102156320 A | 8/2011 |
| JP | 5088168 | 4/1993 |
| JP | 2010282869 | 12/2010 |
| TW | 569068 | 1/2004 |
| TW | 594258 | 6/2004 |
| TW | M277948 | 10/2005 |
| TW | I280426 | 5/2007 |
| TW | 200732753 | 9/2007 |
| TW | M372442 | 1/2010 |

(Continued)

*Primary Examiner* — Elmito Breval
(74) *Attorney, Agent, or Firm* — Winston Hsu; Scott Margo

(57) ABSTRACT

A backlight module includes a light guide board, at least one light emitting unit, a plurality of first glues, and a first reflection sheet. The light guide board has a light entrance surface, a light exit surface, and at least one reflection surface. The reflection surface is connected to the light entrance surface and the light exit surface respectively. The light emitting unit is disposed at the light entrance surface of the light guide board. The plurality of first glues is alternatively disposed on the reflection surface in a from-sparse-to-dense manner. The first reflection sheet is disposed on the plurality of first glues such that the first reflection sheet can be fixed onto the reflection surface.

21 Claims, 6 Drawing Sheets

(56) References Cited

FOREIGN PATENT DOCUMENTS

| TW | I320119 | 2/2010 |
| TW | M381089 | 5/2010 |
| TW | M385714 | 8/2010 |
| TW | I336799 | 2/2011 |

* cited by examiner ent invention will no
BACKLIGHT MODULE AND OPTICAL PLATE THEREOF

BACKGROUND

1. Technical Field

The present disclosure relates to a backlight module and an optical plate thereof, and more specifically, to a backlight module in which glues are alternately disposed between a reflection sheet and a reflection surface of a light guide board in a from-sparse-to-dense manner and an optical plate thereof.

2. Description of the Prior Art

Since liquid crystal molecules do not produce light themselves, a common method for driving an LCD to display images involves utilizing a backlight module to provide light with sufficient brightness and uniform distribution to the LCD. Therefore, a backlight module is one of the major components of an LCD.

A common disposal design of a light source in a backlight module involves disposing a light emitting diode device at a side of a light entrance side-surface of a light guide board. In this design, besides the light exit surface facing the display region of the liquid crystal display device, other light exit surfaces have reflection sheets stuck thereon for light reflection, so as to prevent light loss and increase efficiency of the backlight module in use of light.

However, since light emitted by a light emitting diode device has high directivity and an ear portion is usually formed on the reflection surface for fixing frame components of the backlight module (e.g. a bezel and a plastic frame), light leakage may occur due to reflection of light at a position of the reflection surface corresponding to a bent structure of the ear portion. Furthermore, the brightness of the light exit surface corresponding to a section of the reflection surface close to the light entrance surface could be greater than that corresponding to a section of the reflection surface away from the light entrance surface, so as to influence the image display quality of the liquid crystal display device.

SUMMARY

The embodiment of the present invention provides a backlight module including a light guide board, at least one light emitting unit, a plurality of first glues, and a first reflection sheet. The light guide board has a light entrance surface, a light exit surface, and at least one reflection surface, and the reflection surface is connected to the light entrance surface and the light exit surface respectively. The light emitting unit is disposed on the light entrance surface of the light guide board. The plurality of first glues is alternately disposed on the reflection surface in a from-sparse-to-dense manner. The first reflection sheet is disposed on the plurality of first glues such that the first reflection sheet can be fixed onto the reflection surface.

The embodiment of the present invention further provides an optical plate for a backlight module. The optical plate includes a light guide board, a plurality of first glues, and a first reflection sheet. The light guide board has a light entrance surface, a light exit surface, and a reflection surface connected to the light entrance surface. An area of the reflection surface is less than an area of the light exit surface. The plurality of first glues is alternately disposed on the reflection surface in a from-sparse-to-dense manner. The first reflection sheet is disposed on the plurality of first glues such that the first reflection sheet can be fixed onto the reflection surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
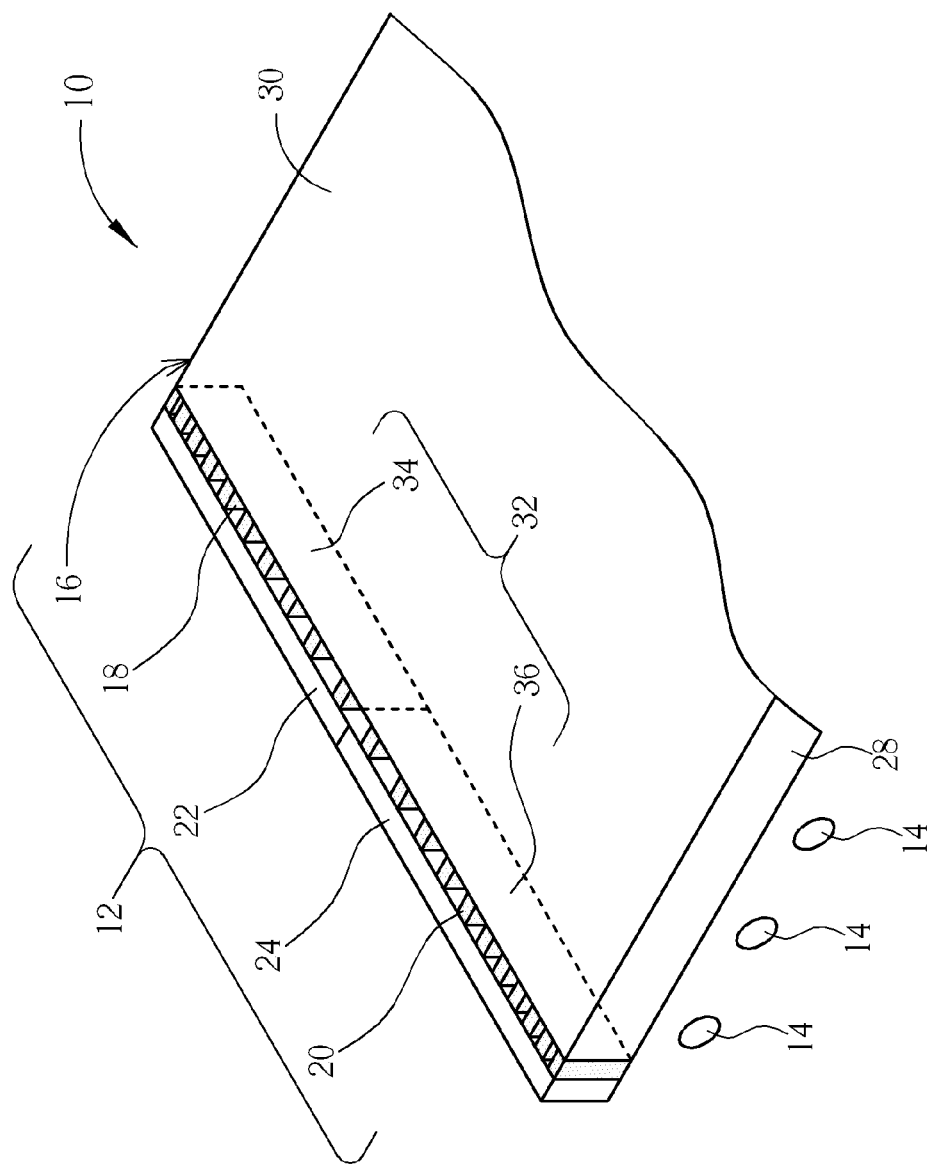
FIG. 1 is a partial diagram of a backlight module according to an embodiment of the present invention.

Please refer to FIG. 1, which is a partial diagram of a backlight module 10 according to an embodiment of the present invention. As shown in FIG. 1, the backlight module 10 includes an optical plate 12 and at least one light emitting unit 14 (three shown in FIG. 1, but not limited thereto). The optical plate 12 includes a light guide board 16, a plurality of first glues 18, a plurality of second glues 20, a first reflection sheet 22, and a second reflection sheet 24. The light guide board 16 has a light entrance surface 28, a light exit surface 30, and at least one reflection surface 32 (one shown in FIG. 1). An area of the reflection surface 32 is less than an area of the light exit surface 30 and the reflection surface 32 is connected to the light entrance surface 28 and the light exit surface 30 respectively. The reflection surface 32 has at least one first region 34 away from the light emitting unit 14 and at least one second region close to the light emitting unit 14 (one shown in FIG. 1 respectively). The light emitting unit 14 is preferably an LED (Light Emitting Diode) and disposed on the light entrance surface 28 of the light guide board 16. The light emitting unit 14 is used for emitting light to the light guide board 16 via the light entrance surface 28.

Figure 2:
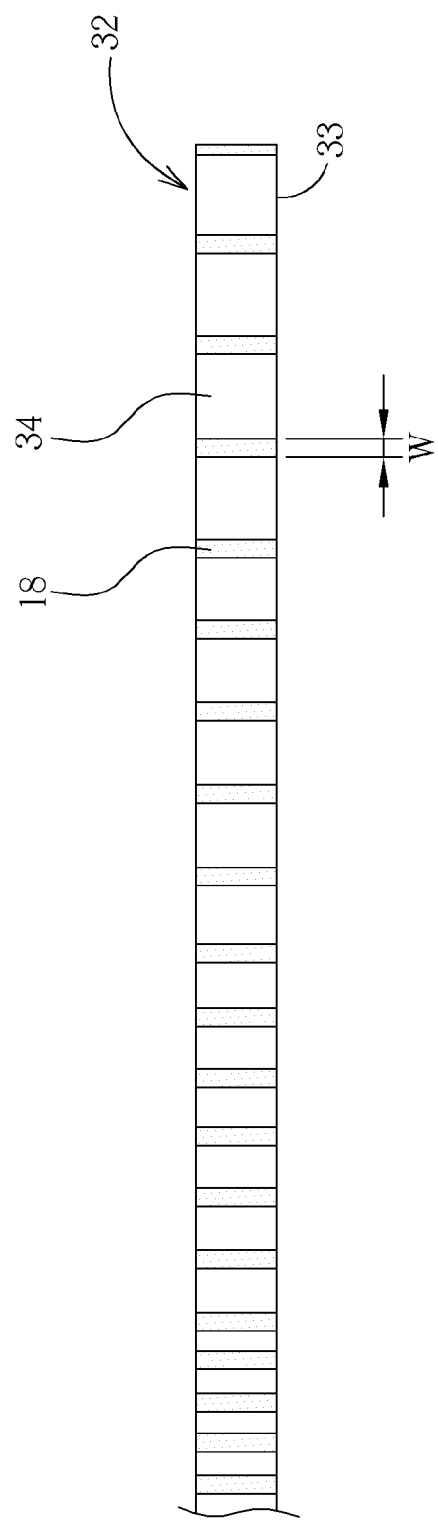
FIG. 2 is a partial diagram of first glues in FIG. 1 being disposed on a first region of a reflection surface.

More detailed description for the design of the first glue 18 is provided as follows. Please refer to FIG. 1 and FIG. 2. FIG. 2 is a partial diagram of the first glues 18 in FIG. 1 being disposed on the first region 34 of the reflection surface 32. In this embodiment, the first glue 18 is made of glue material with low absorbance less than 0.5. The aforesaid absorbance can be simply defined by the following equation.

Absorbance=1−(Reflectance+Transmittance)

In brief, when light is incident into an object, reflection, transmission, and absorption of light may occur. On the premise that amount of the incident light is equal to 1, light absorption efficiency of the object is higher if the absorbance approaches 1. On the contrary, if the absorbance is less than 0.5, it means that the object has higher reflectance and transmittance.

As shown in FIG. 1 and FIG. 2, the plurality of first glues 18 made of glue material with low absorbance is substantially perpendicular to a bottom side 33 of the reflection surface 32 and is alternately disposed between the first reflection sheet 22 and the first region 34 from a position close to the light emitting unit (i.e. a position close to the light entrance surface 28) to a position away from the light emitting unit 14 (i.e. a position away from the light entrance surface 28) in a from-sparse-to-dense manner. Each first glue 18 has an identical width W, and an interval between two adjacent first glues 18 relatively close to the light emitting unit 14 is greater than an interval between two adjacent first glues 18 relatively away from the light emitting unit 14 (as shown in FIG. 2). In such a manner, as long as the sticking positions of the first glues 18 are adjusted appropriately, the purpose that this design is suitable to different sticking machines can be achieved. In this embodiment, the first glues 18 are pressure sensitive adhesive strips for alternately attaching between the first reflection sheet 22 and the first region 34, so as to fix the first reflection sheet 22 onto the first region 34, but not limited thereto. That is, the present invention can also adopt other conventional attaching design (e.g. the first glues 18 being alternately attached between the first reflection sheet 22 and the first region 34 by a screen coating process).

Accordingly, not only can the first glues 18 fix the first reflection sheet 22 to the first region 34 of the reflection surface 32, but also provide a brightness enhancing function when light is incident into the first region 34 since the first glues 18 made of glue material with low absorbance can frustrate total reflection of light on the first region 34 to cause diffusion of light. In other words, via the aforesaid design in which the first glues 18 are alternately disposed on the first region 34 with gradually reducing intervals, the brightness compensation purpose can be achieved. In other words, the section having the sparsely-arranged first glues 18 on the first region 34 (i.e. the brighter section relatively close to the light entrance surface 28) can have a relatively-lower brightness enhancing effect, and the section having the densely-arranged first glues 18 on the first region 34 (i.e. the darker section relatively away from the light entrance surface 28) can have a relatively-higher brightness enhancing effect. Thus, when reflection of light occurs on the first region 34, uneven brightness distribution occurring on the light exit surface 30 of the light guide board 16 corresponding to the first region 34 can be avoided by the optical plate 12 via the aforesaid brightness compensation design. To be noted, since the aforesaid design can provide a brightness enhancing function, the aforesaid design can be preferably applied to the darker section of the light exit surface 30 corresponding to the reflection surface 32.

As for the design of the second glue 20, its related description is provided as follows. In this embodiment, the second glue 20 is made of glue material with high absorbance greater than 0.5. As shown in FIG. 1, the plurality of second glues 20 is alternately disposed between the second reflection sheet 24 and the second region 36 from a position close to the light emitting unit 14 (i.e. a position close to the light entrance surface 28) to a position away from the light emitting unit 14 (i.e. a position away from the light entrance surface 28) in a from-dense-to-sparse manner. Each second glue 20 has an identical width, and an interval between two adjacent second glues 20 relatively close to the light emitting unit 14 is greater than an interval between two adjacent second glues 20 relatively away from the light emitting unit 14. In such a manner, as long as the sticking positions of the second glues 18 are adjusted appropriately, the purpose that this design is suitable to different sticking machines can be achieved. In this embodiment, the second glues 20 are pressure sensitive adhesive strips for alternately attaching between the second reflection sheet 24 and the second region 36, so as to fix the second reflection sheet 24 onto the second region 36, but not limited thereto. That is, the present invention can also adopt other conventional attaching design (e.g. the second glues 20 being alternately attached between the second reflection sheet 24 and the second region 36 by a screen coating process).

Accordingly, not only can the second glue 20 fix the second reflection sheet 24 to the second region 36 of the reflection surface 32, but also provide a brightness reducing function when light is incident into the second region 36 since the second glues 20 can frustrate total reflection of light on the second region 36 and absorb the incident light. In other words, via the aforesaid design in which the second glues 20 are alternately disposed on the second region 36 with gradually reducing intervals, the brightness compensation purpose can be achieved. That is, the section having the densely-arranged second glues 20 on the second region 36 (i.e. the brighter section relatively close to the light entrance surface 28) can have a relatively-higher light absorption effect, and the section having the sparsely-arranged second glues 20 on the second region 36 (i.e. the darker section relatively away from the light entrance surface 28) can have a relatively-lower light absorption effect. Thus, when reflection of light occurs on the second region 36, uneven brightness distribution occurring on the light exit surface 30 of the light guide board 16 corresponding to the second region 36 can be avoided by the optical plate 12 via the aforesaid brightness compensation design. To be noted, since the aforesaid design can provide a brightness reducing function, the aforesaid design can be preferably applied to the brighter section of the light exit surface 30 corresponding to the reflection surface 32.

In summary, the optical plate 12 utilizes the design in which the first glues 18 and the second glues 20 are respectively disposed on the first region 34 and the second region 36 in a from-sparse-to dense manner, to prevent uneven brightness distribution occurring on the light exit surface 30 of the light guide board 16 corresponding to the reflection surface 32. Furthermore, not only can the embodiments of the present invention be performed directly by a conventional glue applying process, but also suitable to the slim light guide board 16. In other words, the present invention of the embodiments can solve the problem that a dot patterning process, which is usually applied to a bottom surface of a light guide board, can not be performed on the excessively narrow reflection surface 32 of the slim light guide board 16. In addition, via the design in which the first reflection sheet 22 and the second reflection sheet 24 are fixed to the side surface (i.e. the light reflection surface 32) of the reflection surface 32 by the first glues 18 and the second glues 20, the embodiments of the present invention can efficiently prevent light leakage toward the horizontal direction of the light guide board 16.

In the embodiments of the present invention, the first region 34 and the second region 36 are not limited to have an identical length, meaning that the length of the first region 34 can also be different from the length of the second region 36. Furthermore, in other embodiment, the first region 34 could be not connected to the second region 36. For example, a connection section with no glue stuck thereon can be formed between the first region 34 and the second region 36.

As for the derivative embodiments of changing the optical characteristics of the first glues 18 and the second glues 20, the related description can be reasoned according to the aforementioned embodiment. In brief, if the first glues 18 are made of glue material with high absorbance instead, the first glues 18 can be alternately disposed between the first reflection sheet 22 and the first region 34 from a position close to the light emitting unit 14 (i.e. a position close to the light entrance surface 28) to a position away from the light emitting unit 14 (i.e. a position away from the light entrance surface 28) in a from-dense-to-sparse manner. On the other hand, if the second glues 20 are made of glue material with low absorbance instead, the second glues 20 can be alternately disposed between the second reflection sheet 24 and the second region 36 from a position close to the light emitting unit 14 (i.e. a position close to the light entrance surface 28) to a position away from the light emitting unit 14 (i.e. a position away from the light entrance surface 28) in a from-sparse-to-dense manner.

It should be mentioned that the first glues 18 could be obliquely disposed on the reflection surface 32 instead of being perpendicular to the bottom side 33 of the reflection surface 32 as shown in FIG. 2. For example, please refer to FIG. 3, which is a partial diagram of the first glues 18 being disposed on the first region 34 of the reflection surface 32 according to another embodiment of the present invention. In this embodiment, an inclined angle θ is formed between each first glues 18 and the bottom side 33 of the reflection surface 32. Accordingly, this design can efficiently prevent regular bright fringes caused by the first glues 18 being perpendicular to the bottom side 33 according to the aforementioned embodiment. Furthermore, for preventing overlapping of two adjacent first glues 18 due to the excessive inclined angle θ, the inclined angle θ is preferably between 45° and 135°. In addition, the embodiments of the present invention can further adopt the design in which the first glues 18 are disposed on the first region 34 of the reflection surface 32 in a mutually-intersecting manner (as shown in FIG. 4). In such a manner, even if the aforesaid regular bright fringes still occur on the light exit surface 30 of the light guide board 16 when the first glues 18 are obliquely disposed on the reflection surface 32, the present invention can further adopt this design to improve the aforesaid fringe problem.

Figure 5:
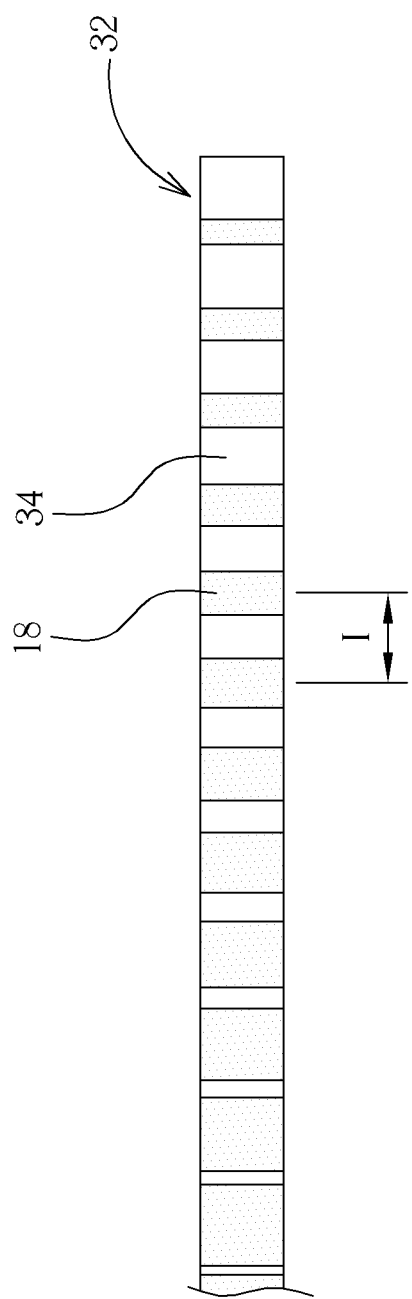
FIG. 5 is a partial diagram of the first glues being disposed on the first region of the reflection surface according to another embodiment of the present invention.

Besides, the design for arrangement of the first glues 18 is not limited to the aforementioned embodiment. For example, please refer to FIG. 5, which is a partial diagram of the first glues 18 being disposed on the first region 34 of the reflection surface 32 according to another embodiment of the present invention. As shown in FIG. 5, the plurality of first glues 18 is alternately arranged on the first region 34 with identical intervals I, and a width of the first glue 18 relatively close to the light emitting unit 14 is less than a width of the first glue 18 relatively away from the light emitting unit 14. Accordingly, the purpose that the first glues 18 are alternately disposed on the first region 34 in a from-sparse-to-dense manner can also be achieved (as shown in FIG. 5). In such a manner, arrangement of the first glues 18 can be changed easily by appropriately adjusting the width of each first glue 18 rather than additionally changing the sticking position of each first glue 18, so as to make adjustment for arrangement of the first glues 18 more convenient.

Furthermore, in another embodiment, if the optical plate 12 utilizes the aforementioned screen coating process to dispose the first glues 18 between the first reflection sheet 22 and the first region 34, the shape design of the first glues 18 can vary with the practical application of the optical plate 12. For example, the first glue 18 can be strip-shaped, solid circle-shaped, solid square-shaped, solid polygon-shaped, hollow circle-shaped, hollow square-shaped, or solid polygon-shaped.

Figure 3:
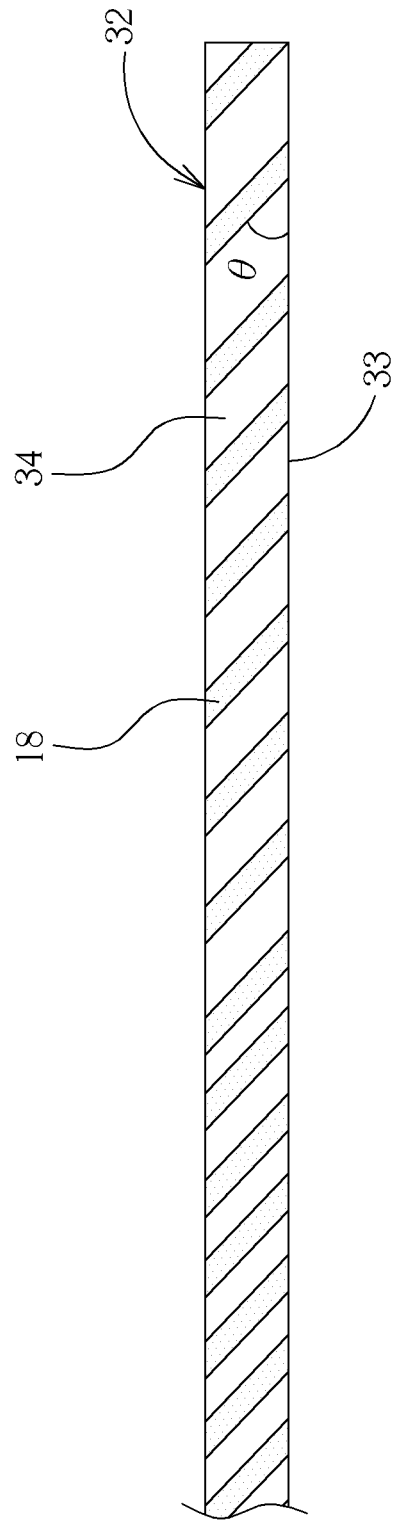
FIG. 3 is a partial diagram of the first glues being disposed on the first region of the reflection surface according to another embodiment of the present invention.
Figure 4:
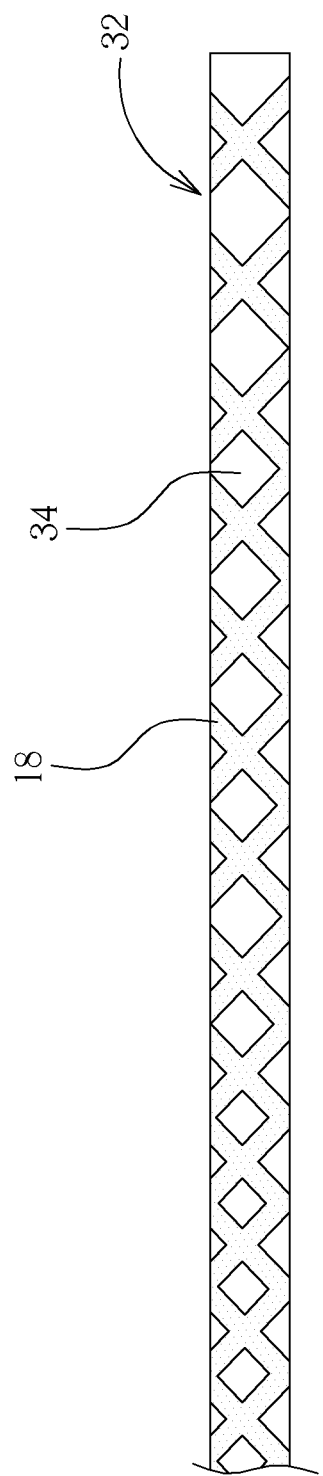
FIG. 4 is a partial diagram of the first glues being disposed on the first region of the reflection surface according to another embodiment of the present invention.

The aforesaid designs for arrangement of the first glues 18 can be also applied to the second glues 20, and the related description can be reasoned according to FIGS. 3-5. For example, the second glues 20 could be alternately arranged on the second region 36 with identical intervals, and a width of the second glue 20 relatively close to the light emitting unit 14 is greater than a width of the second glue 20 relatively away from the light emitting unit 14; otherwise, the second glues 20 could be obliquely disposed on the refection surface 32 or be disposed on the second region 36 in a mutually-intersecting manner.

To be noted, the embodiments of the present invention can also adopt the design in which only one single type of glue is disposed on the reflection surface 32 for simplifying the design of the optical plate 12 in disposal of glue. For example, if the brightness of the light exit surface 30 of the light guide board 16 is high at a position corresponding to the reflection surface 32, the optical plate 12 can just utilize the second glues 20 made of glue material with high absorbance, to be disposed on the first region 34 from a position close to the light emitting unit 14 to a position away from the light emitting unit 14 in a from-dense-to-sparse manner and disposed on the second region 36 from a position away from the light emitting unit 14 to a position close to the light emitting unit 14 in a from-sparse-to-dense manner. In other words, there is only one type of glue with high absorbance disposed on the reflection surface 32 from a position away from the light entrance surface 28 to a position close to the light entrance surface 28 in a from-sparse-to-dense manner for achieving the light absorption purpose, so as to solve the aforesaid problem that the brightness of the light exit surface 30 is high at a position corresponding to the reflection surface 32. In practical application, the second glues 20 made of glue material with high absorbance can also be alternately disposed over the entire area or on the partial area of the reflection surface 32 in a from-sparse-to-dense manner.

On the other hand, if the brightness of the light exit surface 30 of the light guide board 16 is low at the position corresponding to the reflection surface 32, the optical plate 12 can just utilize the first glues 18 made of glue material with low absorbance, to be disposed on the first region 34 from a position close to the light emitting unit 14 to a position away from the light emitting unit 14 in a from-sparse-to-dense manner and disposed on the second region 36 from a position away from the light emitting unit 14 to a position close to the light emitting unit 14 in a from-dense-to-sparse manner. In other words, there is only one type of glue with low absorbance disposed on the reflection surface 32 from a position close to the light entrance surface 28 to a position away from the light entrance surface 28 in a from-sparse-to-dense manner for achieving the brightness enhancing purpose, so as to solve the aforesaid problem that the brightness of the light exit surface 30 is low at the position corresponding to the reflection surface 32. Furthermore, since the first glues 18 made of glue material with low absorbance have higher reflectance and transmittance to cause reflection or transmission of light, meaning that light can be used repeatedly, this design may also increase efficiency of the optical plate 12 in use of light so as to make the optical plate 12 have a preferable brightness. In practical application, the first glues 18 made of glue material with low absorbance can also be alternately disposed over the entire area or on the partial area of the reflection surface 32 in a from-sparse-to-dense manner.

In addition, the embodiments of the present invention can also adopt the design in which two different types of glues are disposed on the same region of the reflection surface 32. For example, if the first glue 18 is made of glue material with low absorbance and the second glue 20 is made of glue material with high absorbance, the optical plate 12 can utilize the first glues 18 to be disposed on a section of the first region 34 relatively away from the light emitting unit 14 in a from-sparse-to-dense manner (from a position close to the light emitting unit 14 to a position away from the light emitting unit 14), and utilize the second glues 20 to be disposed on a section of the first region 34 relatively close to the light emitting unit 14 in a from-dense-to-sparse manner (from a position close to the light emitting unit 14 to a position away from the light emitting unit 14). That is, there are plural sets of the first glues 18 and the second glues 20 alternately disposed on the reflection surface 32. Since the light compensation range of the aforesaid design is twice as wide as that of the design in which only one single type of glue is disposed on one region of the reflection surface 32, the aforesaid design is preferably applied to solve the problem that excessive brightness variation occurs on one region of the light exit surface 30 corresponding to the reflection surface 32. In other words, the present invention can adopt the aforesaid design in which the glues with low absorbance the glues with high absorbance are respectively disposed on the darker section and the brighter section on the same region of the light exit surface to achieve the brightness compensation purpose. To be noted, in the present invention, the size (e.g. the length) of the first glue 18 could be equal to or different from that of the second glue 20 in the same region.

In the embodiments of the present invention, the structural design of the light guide board 16 is not limited to the aforesaid embodiments. For example, please refer to FIG. 6, which is a partial diagram of a backlight module 10' according to another embodiment of the present invention. Components mentioned in this embodiment and the aforementioned embodiment represent component with similar functions or structures, and the related description is omitted herein. The major difference between the backlight module 10' and the backlight module 10 is disposal of an ear portion 38.

Figure 6:
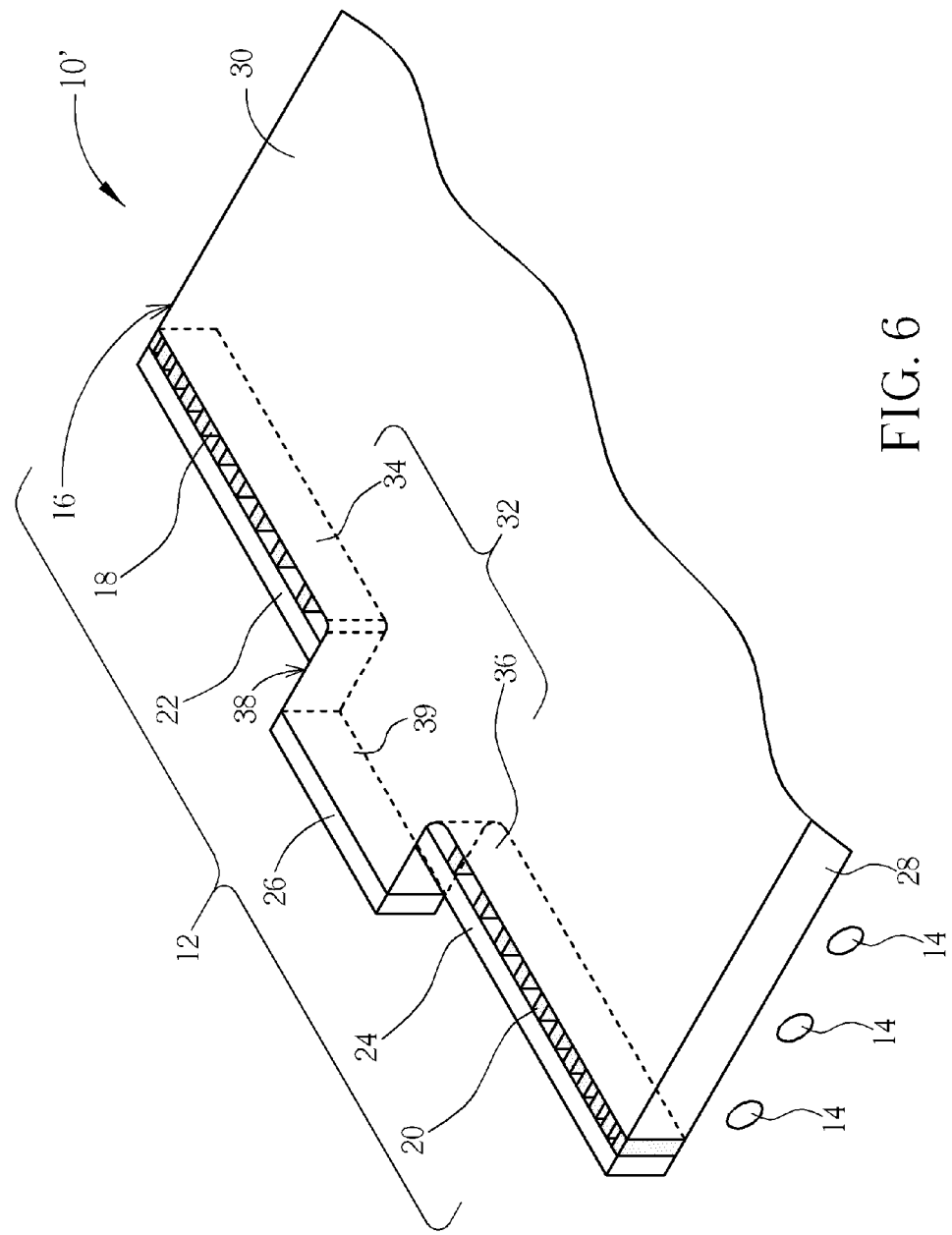
FIG. 6 is a partial diagram of a backlight module according to another embodiment of the present invention.

As shown in FIG. 6, the ear portion 38 protrudes from the reflection surface 32. In this embodiment, the ear portion 38 is located between the first region 34 and the second region 36, meaning that the first region 34 is located at a side of the ear portion 38 relatively away from the light emitting unit 14 and the second region 36 is located at a side of the ear portion 38 relatively close to the light emitting unit 14. The ear portion 38 is used for assembling with frame components (e.g. a bezel or a plastic frame) in the backlight module 10' so as to fix the light guide board 16 in the backlight module 10'. In this embodiment, the ear portion 38 can be, for example, a rectangle-shaped structure, and the optical plate 12 can further include a third reflection sheet 26 attached (e.g. utilizing a glue sticking method) to a side surface 39 of the ear portion 38 parallel to the reflection surface 32 for light reflection, so as to prevent light leakage occurring on the side surface 39. The structural design of the ear portion 38 is not limited to FIG. 6, meaning that the ear portion 38 can be other common protruding structure, such as a trapezoid-shaped structure or a triangle-shaped structure.

As for the derivative designs of the first glues 18 and the second glues 20 in this embodiment, they can be reasoned according to the aforementioned embodiments and FIGS. 2-5, For example, as shown in FIG. 6, the plurality of first glues 18 could be alternately disposed between the first reflection sheet 22 and the first region 34 from a position close to the light emitting unit 14 (i.e. a position close to the ear portion 38) to a position away from the light emitting unit 14 (i.e. a position away from the ear portion 38) in a from-sparse-to-dense manner, so as to fix the first reflection sheet 22 onto the first region 34 of the reflection surface 32.

Accordingly, the section having the sparsely-arranged first glues 18 on the first region 34 (i.e. the section relatively close to the light entrance surface 28 and close to the ear portion 38) can have a relatively-lower brightness enhancing effect, and the section having the densely-arranged first glues 18 on the first region 34 (i.e. the section relatively away from the light entrance surface 28 and away from the ear portion 38) can have a relatively-higher brightness enhancing effect. Thus, when reflection of light occurs on the first region 34, not only can uneven brightness distribution occurring on the light exit surface 30 of the light guide board 16 corresponding to the first region 34 be avoided by the optical plate 12 via the aforesaid brightness compensation design, but also prevent light leakage caused by reflection of light occurring on the reflection surface 32 corresponding to the bent structure of the ear portion 38.

On the other hand, the plurality of second glues 20 could be alternately disposed between the second reflection sheet 24 and the second region 36 from a position close to the light emitting unit 14 (i.e. a position away from the ear portion 38) to a position away from the light emitting unit 14 (i.e. a position close to the ear portion 38) in a from-dense-to-sparse manner, so as to fix the second reflection sheet 24 onto the second region 36 of the reflection surface 32.

Accordingly, the section having the densely-arranged second glues 20 on the second region 36 (i.e. the section relatively close to the light entrance surface 28 and away from the ear portion 38) can have a relatively-higher light absorption effect, and the section having the sparsely-arranged second glues 20 on the second region 36 (i.e. the section relatively away from the light entrance surface 28 and close to the ear portion 38) can have a relatively-higher light absorption effect. Thus, when reflection of light occurs on the second region 36, not only can uneven brightness distribution occurring on the light exit surface 30 of the light guide board 16 corresponding to the second region 36 be avoided by the optical plate 12 via the aforesaid brightness compensation design, but also prevent light leakage caused by reflection of light occurring on the reflection surface 32 corresponding to the bent structure of the ear portion 38.

Since reflection of light may easily occur on the bent structure of the ear portion 38 in FIG. 6 so as to cause excessive brightness variation at a position of the light exit surface 30 corresponding to the reflection surface 32, this embodiment may preferably adopt the aforesaid design in which the glues with low absorbance and the glues with high absorbance are respectively disposed on the darker section and the brighter section on the same region of the light exit surface for the brightness compensation purpose.

Compared with the prior art, the present invention utilizes the design in which the glues are disposed between the reflection sheet and the reflection surface in a from-sparse-to-dense manner. In such a manner, not only can the present invention prevent light leakage caused by reflection of light occurring on the reflection surface corresponding to the bent structure of the ear portion, but also avoid uneven brightness distribution occurring on the light exit surface of the light guide board corresponding to the sections close to and away from the light entrance surface, so as to improve the image display quality of the liquid crystal display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight module comprising:
a light guide board having a light entrance surface, a light exit surface, and at least one reflection surface, and the reflection surface being connected to the light entrance surface and the light exit surface respectively and having at least one first region and at least one second region;

at least one light emitting unit disposed on the light entrance surface of the light guide board;

a plurality of first glues alternately disposed on the first region in a from-sparse-to-dense manner;

a plurality of second glues alternately disposed on the second region in a from-sparse-to-dense manner, a light absorbance of each first glue being less than a light absorbance of each second glue;

a first reflection sheet disposed on the plurality of first glues such that the first reflection sheet can be fixed onto the reflection surface; and a second reflection sheet disposed on the plurality of second glues such that the second reflection sheet can be fixed onto the reflection surface.

2. The backlight module of claim 1, wherein each first glue is made of glue material with low absorbance, and the plurality of first glues is alternately disposed on the reflection surface from a position close to the light emitting unit to a position away from the light emitting unit in a from-sparse-to-dense manner.

3. The backlight module of claim 2, wherein the plurality of first glues is arranged on the reflection surface with the same intervals, and a width of the first glue relatively close to the light emitting unit is greater than a width of the first glue relatively away from the light emitting unit.

4. The backlight module of claim 1, wherein each first glue has an identical width, and an interval between two adjacent first glues relatively close to the light emitting unit is less than an interval between two adjacent first glues relatively away from the light emitting unit.

5. The backlight module of claim 1, wherein each first glue is made of glue material with high absorbance, and the plurality of first glues is alternately disposed on the reflection surface from a position close to the light emitting unit to a position away from the light emitting unit in a from-dense-to-sparse manner.

6. The backlight module of claim 5, wherein the plurality of first glues is arranged on the reflection surface with the same intervals, and a width of one first glue relatively close to the light emitting unit is greater than a width of one first glue relatively away from the light emitting unit.

7. The backlight module of claim 5, wherein each first glue has an identical width, and an interval between two adjacent first glues relatively close to the light emitting unit is less than an interval between two adjacent first glues relatively away from the light emitting unit.

8. The backlight module of claim 1, wherein the at least one first region is away from the light emitting unit, the at least one second region is close to the light emitting unit, the plurality of first glues is alternately disposed on the first region from a position close to the light emitting unit to a position away from the light emitting unit in a from-sparse-to-dense manner, and the plurality of second glues is alternately disposed on the second region from a position close to the light emitting unit to a position away from the light emitting unit in a from-dense-to-sparse manner.

9. The backlight module of claim 8, wherein the plurality of first glues is arranged on the first region with the same intervals, and a width of the first glue relatively close to the light emitting unit is less than a width of the first glue relatively away from the light emitting unit.

10. The backlight module of claim 8, wherein each first glue has an identical width, and an interval between two adjacent first glues relatively close to the light emitting unit is greater than an interval between two adjacent first glues relatively away from the light emitting unit.

11. The backlight module of claim 8, wherein the plurality of second glues is arranged on the second region with the same intervals, and a width of the second glue relatively close to the light emitting unit is greater than a width of the second glue relatively away from the light emitting unit.

12. The backlight module of claim 8, wherein each second glue has an identical width, and an interval between two adjacent second glues relatively close to the light emitting unit is less than an interval between two adjacent first glues relatively away from the light emitting unit.

13. The backlight module of claim 8, wherein an ear portion protrudes from the reflection surface, the first region is located at a side of the ear portion relatively away from the light emitting unit, and the second region is located at a side of the ear portion relatively close to the light emitting unit.

14. The backlight module of claim 13 further comprising:
a third reflection sheet attached to a side surface of the ear portion parallel to the reflection surface.

15. The backlight module of claim 1, wherein each first glue is strip-shaped, solid circle-shaped, solid square-shaped, solid polygon-shaped, hollow circle-shaped, hollow square-shaped, or solid polygon-shaped.

16. The backlight module of claim 15, wherein each first glue is strip-shaped, and an included angle between each first glue and a bottom side of the reflection surface is between 45° and 135°.

17. The backlight module of claim 16, wherein the plurality of first glues is substantially perpendicular to the bottom side of the reflection surface.

18. The backlight module of claim 16, wherein the plurality of first glues is disposed on the reflection surface in a mutually-intersecting manner.

19. An optical plate for a backlight module, the optical plate comprising:
a light guide board having a light entrance surface, a light exit surface, and a reflection surface connected to the light entrance surface, the reflection surface having a first region, a second region, and an ear portion located between the first region and the second region, and an area of the reflection surface being less than an area of the light exit surface;

a plurality of first glues alternately disposed on the reflection surface, the first glues located on the second region being alternately disposed from a position close to the ear portion to a position away from the ear portion in a from-sparse-to-dense manner when the first glues located on the first region are alternately disposed from a position close to the ear portion to a position away from the ear portion in a from-dense-to-sparse manner; and a first reflection sheet disposed on the plurality of first glues such that the first reflection sheet can be fixed onto the reflection surface.

20. An optical plate for a backlight module, the optical plate comprising:
a light guide board having a light entrance surface, a light exit surface, and a reflection surface connected to the light entrance surface, the reflection surface has a first region, a second region, and an ear portion located between the first region and the second region, and an area of the reflection surface being less than an area of the light exit surface;

a plurality of first glues alternately disposed on the reflection surface;

a plurality of second glues alternately disposed on the reflection surface, the plurality of second glues being alternately disposed on the second region from a position close to the ear portion to a position away from the ear portion in a from-dense-to-sparse manner when the plurality of first glues is alternately disposed on the first region from a position close to the ear portion to a position away from the ear portion in a from-dense-to-sparse manner; and a first reflection sheet disposed on the plurality of first glues such that the first reflection sheet can be fixed onto the reflection surface.

21. An optical plate for a backlight module, the optical plate comprising:

a light guide board having a light entrance surface, a light exit surface, and a reflection surface connected to the light entrance surface, the reflection surface has a first region, a second region, and an ear portion located between the first region and the second region, and an area of the reflection surface being less than an area of the light exit surface;

a plurality of first glues alternately disposed on the reflection surface;

a plurality of second glues alternately disposed on the reflection surface, the plurality of second glues being alternately disposed on the second region from a position close to the ear portion to a position away from the ear portion in a from-sparse-to-dense manner when the plurality of first glues is alternately disposed on the first region from a position close to the ear portion to a position away from the ear portion in a from-sparse-to-dense manner; and a first reflection sheet disposed on the plurality of first glues such that the first reflection sheet can be fixed onto the reflection surface.

* * * * *